P. J. A. SCHNOOR.
CAR DOOR.
APPLICATION FILED JUNE 11, 1909.

947,947.

Patented Feb. 1, 1910.

Witnesses

INVENTOR
Peter J. A. Schnoor.
By C. A. Snow & Co.
Attorneys

UNITED STATES PATENT OFFICE.

PETER J. A. SCHNOOR, OF HOLSTEIN, IOWA, ASSIGNOR TO THE GREAT WESTERN NOVELTY COMPANY, OF OMAHA, NEBRASKA.

CAR-DOOR.

947,947.  Specification of Letters Patent.  Patented Feb. 1, 1910.

Application filed June 11, 1909.  Serial No. 501,606.

*To all whom it may concern:*

Be it known that I, PETER J. A. SCHNOOR, a citizen of the United States, residing at Holstein, in the county of Ida and State of Iowa, have invented a new and useful Car-Door, of which the following is a specification.

This invention has relation to car doors and it consists in the novel construction and arrangement of its parts, as hereinafter shown and described.

The object of the invention is to provide a structure in the form of a car door designed to be used upon cars for transporting live stock, merchandise, etc., and with this object in view the structure is so arranged as to insure that the door may be readily opened irrespective of any outward bulge that the side of the car may assume, or the accumulation of ice or other foreign matter upon the track-ways of the door. Furthermore, the parts of the structure are so assembled that when the door is in a closed or in an open position it is impossible for the same to swing outwardly at its lower edge and thereby strike a passing train when the car is in motion. Also means is provided for effectually securing the door in a closed position whereby the same may be sealed in an appropriate manner.

Figure 1:
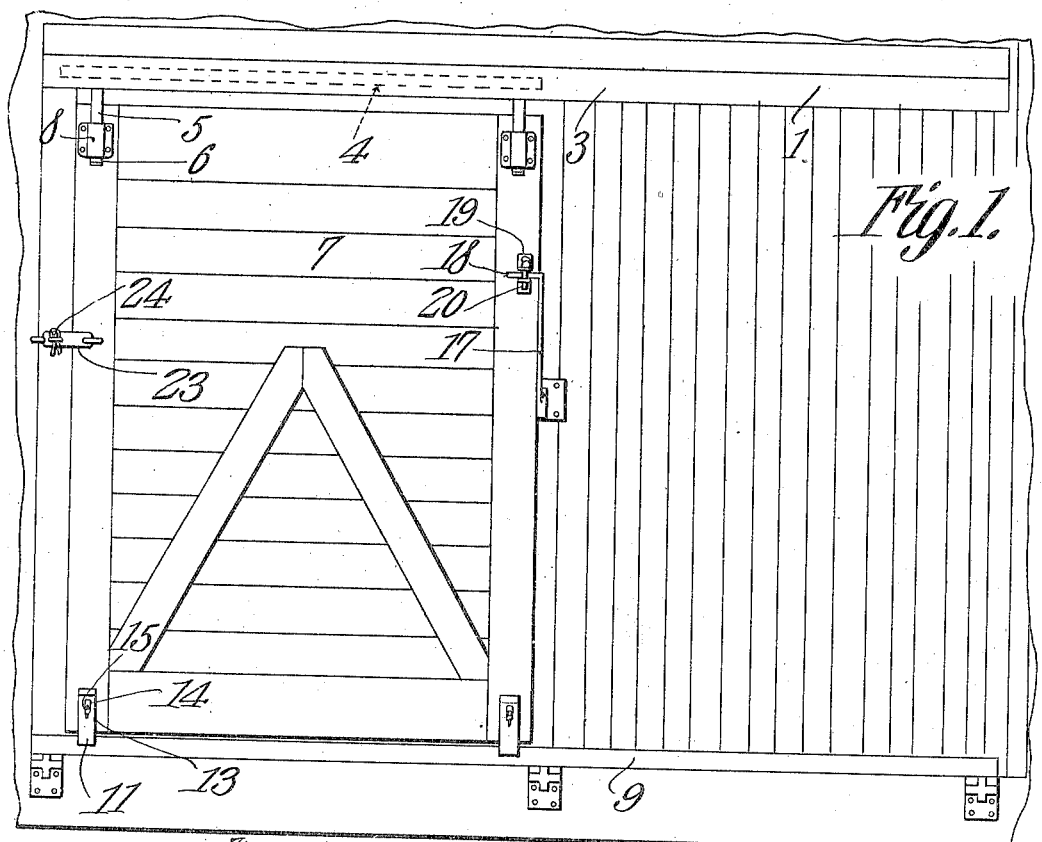
Figures 2, 3, 4:
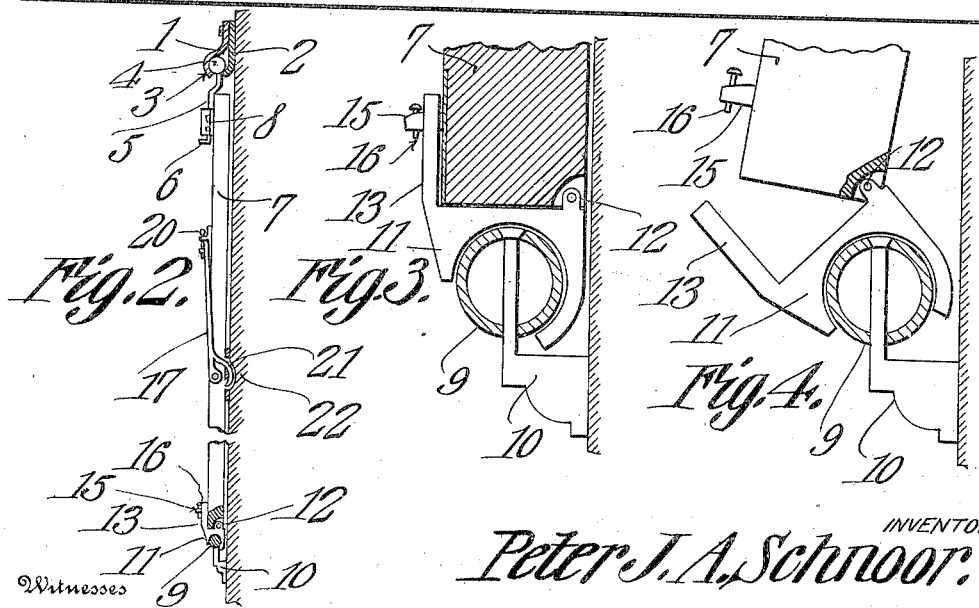

In the accompanying drawing:—Figure 1 is a side elevation of a portion of a car showing the door located thereon and in a closed position. Fig. 2 is an edge elevation of the door showing the same applied to a car, a portion of which is shown in section. Fig. 3 is an enlarged transverse sectional view of a supporting track for the door, and parts located thereon, showing their relative positions when the door is closed. Fig. 4 is a similar transverse sectional view, showing the relative positions of the parts when the door is about to be or is in the act of being opened.

At the upper portion of the car a guide 1 is located, and the said guide consists of a plate 2, which is longitudinally concaved and is secured directly to the side of the car, and a plate 3, which is substantially ogee shaped in transverse section, and which is secured directly at its upper portion to the outer side of the plate 2. The lower edges of the plates 2 and 3 are spaced from each other.

A runner 4 is located between the plates 2 and 3 and is provided in the vicinity of its opposite ends with depending shanks 5, which project downwardly through the space between the lower edges of the said plates. The lower ends of the shanks 5 terminate in outwardly disposed lugs or flanges 6. A door proper 7 is provided upon its upper outer side portion with clips 8, which slidably receive the shanks 5.

A cylindrical track 9 is supported at the lower portion of the side of the car upon brackets 10, which are fixed to the outer side of the car. The track 9 is parallel with the guide 1, located at the upper portion of the side of the car. Interrupted rings 11 snugly receive the track 9 and are pivotally connected at their upper inner edge portions to the lower edge of the door proper 7, as at 12. The rings 11 are so positioned that the portions of the brackets 10 which join with the track 9 may pass through the interruptions thereof as the door is moved longitudinally along the track. Each ring 11 is provided at its upper, outer portion with an upstanding lug 13. Each lug 13 is provided with a perforation 14. Pins 15 project beyond the plane of the outer face of the door proper 7, and are adapted to enter the perforations 14 of the lugs 13 in the manner as indicated in Figs. 1 and 3 of the drawing, and when so inserted in the said perforations are secured by cotter pins 16, or equivalent devices.

A securing lever 17 is fulcrumed to one edge of the door proper 7, and is provided with a laterally disposed handle extremity 18, which is adapted to enter a shackle 19, mounted upon the outer face of the door proper 7. When the handle portion 18 is located in the said shackle it may be secured therein by means of a pin 20, as illustrated in Figs. 1 and 2 of the drawing. The lever 17 is provided upon its rear edge and in the vicinity of its fulcrum point with a curved tongue 21, which is adapted to enter a keeper 22 mounted upon the outer side of the car. At its opposite edge the door proper 7 is provided with a hasp 23, which is adapted to engage a staple 24, also located upon the side of the car, and when in such engagement a seal of usual pattern may be passed through the said staple and about the said hasp in the ordinary manner.

From the above description it will be seen that when the door proper 7 is closed and the securing lever 17 is swung upwardly into engagement with the shackle 19, that the curved tongue carried by the said securing lever will engage the keeper 22 and pull the lower portion of the door proper 7 into close contact with the outer side of the car. When the door is thus closed it may be secured by the hasp and staple as above described. When it is desired to open the door, the free end of the lever 17 is swung down, which movement on the part of the lever disengages the tongue 21 from the keeper 22, and the lower portion of the door proper 7 is free to swing, to a limited extent, away from the side of the car. The outward swinging movement of the lower portion of the door proper is limited by the rings 11 which turn upon the track 9 as an axis and assume positions as illustrated in Fig. 4 of the drawing. Thus, should the side of the car be in a bulged condition, the door is swung sufficiently away from the side in order to permit the door to escape the bulge as it is moved along the track and guide-way. Also, the outward swing of the door at the time it is about to be opened will fracture any accumulation of ice upon the connecting parts between the door and the track and guide-way, and thus render the door free for the longitudinal movement indicated. It is by reason of the fact that the clip 8 slidably receives the shanks 5 that the lower portion of the door may have the outward swing described, and at the same time, the upper and lower portions of the door are secured to such an extent as to prevent the possibility of the door swinging laterally from the side of the car to come in contact with the side of a car moving upon an adjacent track.

Having described my invention, what I claim as new, and desire to secure, by Letters Patent, is:—

A door structure comprising a lower track and an upper guide, a runner mounted for movement along the guide and having depending shanks, a door located between the track and guide and having sliding engagement with the shanks of the runner for limited movement along the same, and rings pivotally connected to the lower end of the door at points adjacent the inner sides thereof and receiving the track.

In testimony that I claim the foregoing as my own, I have hereto affixed my signature in the presence of two witnesses.

PETER J. A. SCHNOOR.

Witnesses:
   F. D. Thielmann,
   Albert G. Merkley.